(12) United States Patent
Cochran et al.

(10) Patent No.: US 8,803,666 B2
(45) Date of Patent: Aug. 12, 2014

(54) UNIVERSAL ACCESS DEVICE

(75) Inventors: Edward L. Cochran, Morristown, NJ (US); Bruce W. Anderson, Morristown, NJ (US); David T. Spoor, Morristown, NJ (US); Thomas R. Markham, Morristown, NJ (US); Robert C. Becker, Morristown, NJ (US)

(73) Assignee: Honeywell International Inc., Morristown, NJ (US)

( * ) Notice: Subject to any disclaimer, the term of this patent is extended or adjusted under 35 U.S.C. 154(b) by 186 days.

(21) Appl. No.: 13/545,631

(22) Filed: Jul. 10, 2012

(65) Prior Publication Data
US 2014/0015638 A1    Jan. 16, 2014

(51) Int. Cl.
*G06K 19/06* (2006.01)

(52) U.S. Cl.
USPC .............. 340/13.26; 340/5.65; 340/10.4

(58) Field of Classification Search
CPC .......... G06K 7/10297; G06K 19/0723; G06K 19/0725; G06K 19/0727; G06Q 20/341
USPC ..................... 340/5.65, 13.26, 10.4
See application file for complete search history.

(56) References Cited

U.S. PATENT DOCUMENTS

2006/0118622 A1* 6/2006 Zatloukal et al. .............. 235/382
2007/0274242 A1* 11/2007 Lamacraft et al. ............. 370/310
2012/0074232 A1* 3/2012 Spodak et al. ................. 235/492
2012/0178366 A1* 7/2012 Levy et al. .................... 455/41.1

OTHER PUBLICATIONS

NXP, "Product data sheet" TDA8007BHL Multiprotocol IC card interface, Rev. 9.1, Jun. 18, 2012, Accessed on Jul. 9, 2012, from: http://www.nxp.com/documents/data_sheet/TDA8007BHL.pdf (51 pages).
Maxim, "Smart Card Power Supply and Communication for Two Physically eperate Interfaces with Extended Operating Temperature", DS8007A Automotive Grade Miltiprotocol Dual Smart Card Interface, Rev. 0, Jun. 17, 2010, Accessed on Jul. 9, 2012, from: http://www.maxim-ic.com/datasheet/index.mvp/id/6582 (2 pages).
NXP, "Dual Multiprotocol Smart Card Coupler" DatasheetZone, Accessed on Jul. 9, 2012, from: http://www.dz863.com/datasheet-816885963-TDA8008_Dual-Multiprotocol-Smart-Card-Coupler/ (2 pages).
Vasudevan, "Smart Card Layout and Authentication Protocol for Access Control System in Military Application" Department of Computer Science & Engineering, India Institute of Technology Kanpur, Jul. 2009, Accessed on Jul. 9, 2012, from: http://www.security.iitk.ac.in/contents/publications/mtech/VinodVasudevan.pdf (85 pages).

* cited by examiner

*Primary Examiner* — Andrew Bee
(74) *Attorney, Agent, or Firm* — Brooks, Cameron & Huebsch, PLLC

(57) ABSTRACT

Systems, methods, and computer-readable and executable instructions are provided for providing a universal access device. Providing a universal access device can include storing access data for each of a number RFID readers, wherein each of the RFID readers accepts a particular RFID protocol. Providing a universal access device can also include selecting a particular RFID protocol for one of the number of RFID readers while the universal access device is within an activation zone of the RFID reader. Furthermore, providing a universal access device can include providing the access data for the particular RFID reader via the particular RFID protocol.

20 Claims, 3 Drawing Sheets

UNIVERSAL ACCESS DEVICE

GOVERNMENT RIGHTS

This invention was made with Government support. The Government has certain rights in the invention.

TECHNICAL FIELD

The present disclosure relates to providing a universal access device.

BACKGROUND

A communication protocol can be a way of organizing a wireless conversation between a number of devices (e.g., access card, tag, reader, access device, etc.). For example, the communication protocol can include an air interface type (e.g., how the data is transferred, etc.), an access control (e.g., which device initiates the communication, etc.), and/or data definitions (e.g., type of data associated with a tag, interpretation of the data sent, etc.).

There are various protocols that use different approaches for the wireless conversation between devices. The various protocols typically require that a reader and a tag (e.g., access card, etc.) utilize the same communication protocol. If the communication protocol is not the same, the data to be sent may not be sent properly or not be sent at all.

The data to be sent can be a unique identifier (e.g., access data, electronic product code (EPC), etc.). The unique identifier can be verified by the reader to determine a number of characteristics of the data (e.g., type of card, issuer of the card, user of the card, etc.). A particular unique identifier can instruct a particular action of the reader. For example, a particular unique identifier can allow access to a restricted area by instructing the reader to unlock a door to the restricted area.

DETAILED DESCRIPTION

Figure 1:
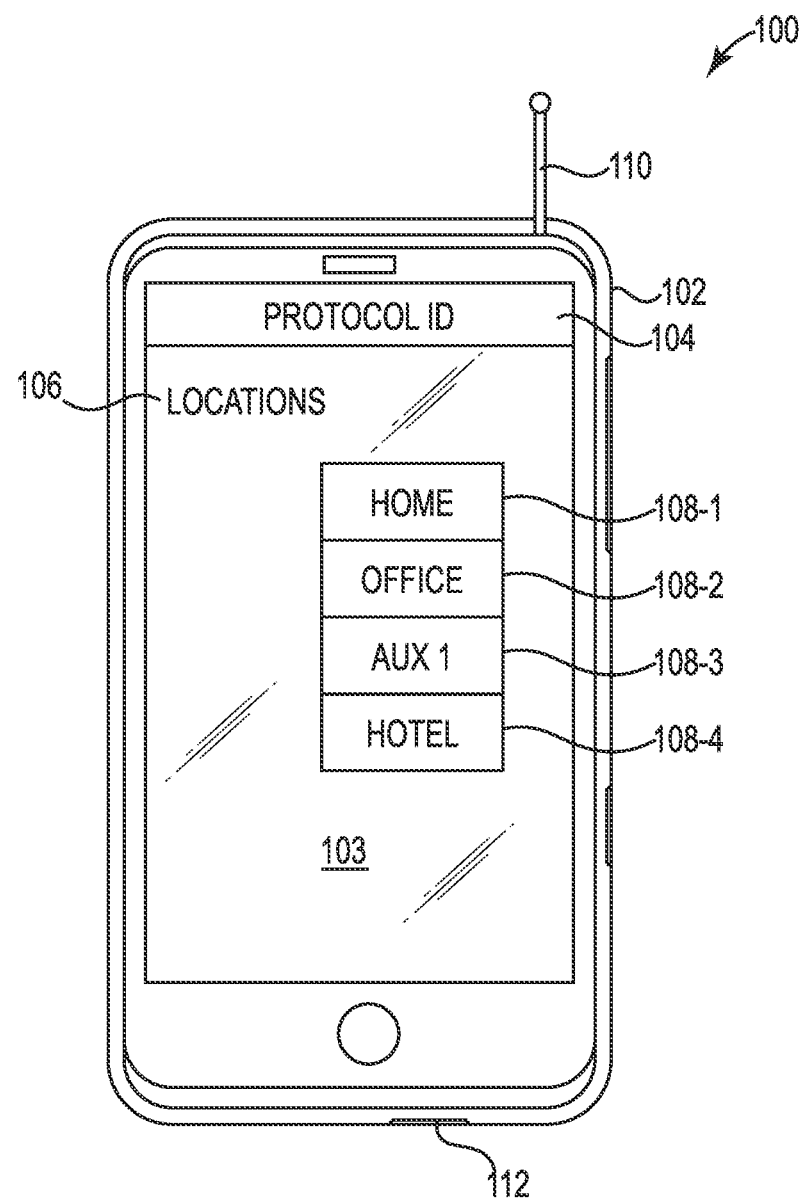
FIG. 1 illustrates an example universal access device in accordance with one or more embodiments of the present disclosure.

Devices, methods, and systems for providing a universal access device are described herein. For example, one or more embodiments can include storing access data for each of a number RFID readers, wherein each of the RFID readers accepts a particular RFID protocol. One or more embodiments can also include selecting a particular RFID protocol for one of the number of RFID readers while the universal access device is within an activation zone of the RFID reader. Furthermore, one or more embodiments can include providing the access data for the particular RFID reader via the particular RFID protocol.

The proliferation of such a variety of protocols has become an issue for users access devices. For example, one might be required to carry an access card for one's place of work, a separate card for a hotel, a third card for the subway fare, and a key fob for a car. All of these interface devices can use different communications protocols and store specific data (e.g., access data, etc.) associated with each intended use (the money remaining on the fare card, the checkout day for the hotel guest, and/or the employee number for building access.)

A universal access device can include a computing device, as described herein, that can store access data (e.g., pass codes, identity information, security information, etc.) for a number of RFID readers. The universal access device can be used to determine a particular protocol (e.g., near field communication (NFC), ISO/IEC 14443, Prox, DESfire, IClass, etc.) of a reader (e.g., RFID reader, access reader, etc.). A user may use a number of different RFID readers that each utilize a different communication protocol. Each RFID reader may be located at a particular location (e.g., geographical location, location within a compound, etc.) and can be used for a particular purpose (e.g., access an area of a location, etc.).

The protocol and the location can be saved as a profile by a user of the universal access device, along with the data that is pertinent to that location. The universal access device can determine (e.g., retrieve, etc.) the access data that corresponds to the particular location and transmit the access data to the reader using the particular protocol.

The universal access device can enable a user to access and transmit access data to a number of different readers when the number of different readers utilize different access data and/or different protocols.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 102 may reference element "02" in FIG. 1, and a similar element may be referenced as 302 in FIG. 3.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of objects" can refer to one or more objects.

FIG. 1 illustrates an example universal access device 100 in accordance with one or more embodiments of the present disclosure. The universal access device 100 can include a portable computing device 102 (e.g., cell phone, smart phone, personal digital assistant (PDA), etc.).

The portable computing device 102 can include an antenna 110. The antenna 110 is shown in FIG. 1 as an exterior antenna for illustrative purposes only. The antenna 110 can be an internal antenna within the portable computing device 102. The antenna 110 can also be an existing antenna within the portable computing device 102 (e.g., cellular antenna, Bluetooth antenna, etc.). The antenna 110 can also include an additional antenna to the existing antenna within the portable computing device 102 that is configured to provide wireless signals that may not be capable of being produced by the existing antenna within the portable computing device. The antenna 110 can also be connected through a connection port 112 (e.g., universal serial bus (USB), mini-USB, micro-USB, dock connector, etc.) of the portable computing device 102. The universal access device 100 can utilize the antenna 110 of a portable computing device 102 to determine a RFID protocol for a number of RFID readers.

Each protocol for the number of RFID readers can be different. For example, a first RFID reader can utilize ISO 14443B and a second RFID reader can utilize ISO 18000-6C. Through communication with a particular reader, the universal access device 100 can determine a protocol for each of the number of RFID readers. For example, the universal access device 100 can be placed within an activation zone (e.g., relatively close proximity, area that is able to transfer data, area that is able to produce current for a smart card, etc.) of a RFID reader and through communication with the RFID reader, the universal access device 100 can determine the particular RFID protocol of the RFID reader.

Each protocol can have a number of unique features that can be utilized by the universal access device 100 to determine the RFID protocol. For example, the universal access device 100 can determine what frequency a particular RFID reader uses to communicate with an access device (e.g., tag, smart card, etc.). In another example, the universal access device 100 can determine if the particular RFID reader powers an access device within the activation zone. In another example, the universal access device 100 can determine a sequence of communication between a particular RFID reader and an access device. Furthermore, the universal access device 100 can determine a data type (e.g., file format, etc.) used for a particular RFID protocol.

The universal access device 100 can compare the number of unique features of the particular RFID reader to a number of stored RFID protocol features. For example, the universal access device 100 can determine a frequency, a power capability, data type, communication type, and/or a sequence of communication for a particular RFID reader and compare the unique features of a number of stored RFID reader features to determine the RFID protocol for the particular RFID reader. This can enable the universal access device to communicate with the reader.

The access data, as described herein, can be used by the RFID reader to identify a user, grant access, etc. The universal access device 100 can determine a corresponding (e.g., required, etc.) access data for the determined RFID protocol. The access data can be provided by the user, by the owner of the system being accessed upon registration, or by other means. The universal access device 100 can select corresponding access data for a determined RFID protocol and the location, and transfer the access data to the RFID reader utilizing the determined RFID protocol. The universal access device can also transfer the access data in a particular format for the determined RFID protocol.

The universal access device 100 can also determine a current location (e.g., geographic location, etc.) of the user. For example, the universal access device 100 can be a portable computing device 102 with a global positioning system (GPS) or other location device. The universal access device 100 can utilize the determined RFID protocol and a current location of the user to determine access data for a particular RFID reader. For example, the universal access device 100 can include stored access data for a corresponding RFID protocol and a corresponding geographic location. In this example, the universal access device 100 can determine if the determined RFID protocol and the current location correspond to stored access data. If the determined RFID protocol and the current location correspond to a stored access data, the universal access device 100 can transfer the corresponding access data to the RFID reader using the determined RFID protocol.

A number of locations (e.g., geographic descriptions, geographic locations, etc.) with corresponding access data and a corresponding RFID protocol can be stored in the memory of the portable computing device 102. For example, a profile can be created and stored in memory for a particular location with a particular RFID reader. The particular location can be given a name (e.g., home, office, auxiliary (AUX), hotel, etc.). The name of the particular location can be displayed by the universal access device 100 and allow the user to select a particular location with a corresponding RFID reader.

The profile for the location can also include a particular protocol for the RFID reader at the particular location. For example, if the protocol for a user's home profile is near field communication (NFC), then NFC can be stored as the corresponding protocol for the home profile. In this example, when the user selects the home profile, the universal access device can utilize NFC to transfer access data corresponding to the home profile.

The profile for the location can also include access data for the RFID reader at the particular location. For example, access data can include a password or passkey that can enable the RFID reader to perform an action (e.g., unlock a door, grant access to a restricted area, etc.). The access data can be sent to the RFID reader using the RFID protocol corresponding to the profile for the location. The access data can be stored in memory of the universal access device 100 in a particular format corresponding to the protocol for the corresponding RFID protocol.

The portable computing device 102 can also include a user interface 103 (e.g., display, touch sensitive display, selection tool, etc.). The user interface 103 can include various information and selectable options based on a determined RFID protocol. For example, if the universal access device 100 determines that the RFID protocol is ISO 18000-6C, the user interface 103 can display the protocol ID at 104. The protocol ID 104 can inform the user of the general protocol that a particular RFID reader utilizes.

The user interface 103 can include a list of selectable options. For example, each of a number of options can include a heading that can notify the user of the selectable option. For example, a heading of a number of locations 106 can be utilized to indicate to a user that the determined protocol listed in the protocol ID 104 is utilized by the RFID readers at the displayed list of locations.

The heading of a number of locations 106 can include a list of selectable locations 108-1, 108-2, . . . , 108-N. For example, a particular RFID protocol can be used a first location HOME 108-1 and a second location OFFICE 108-2. Even though the first location HOME 108-1 and the second location OFFICE 108-2 utilize the same RFID protocol, the access data associated with the first location HOME 108-1 and the second location OFFICE 108-2 can be different. In this example, the user can select the location that the user is attempting to send the access data. For example, if the user is at their home or at a location that the user has identified as HOME 108-1, then the user can select HOME 108-1 and the universal access device 100 can transmit the access data corresponding to HOME 108-1 utilizing the protocol corresponding to HOME 108-1. As described herein, the format of the access data can also be different for the first location HOME 108-1 and the second location OFFICE 108-2.

A number of other locations can be added and stored to memory by the user as selectable profiles. For example, a user can add a selectable profile for a particular protocol (e.g., AUX-1 108-3, Hotel 108-4, etc.) The number of selectable profiles can be short-term profiles that are for a relatively short time period (e.g., hours, days, weeks, etc.). The selectable profiles can be locations where the access data can change frequently. For example, a user can visit many hotels with that use the same RFID protocol for their rooms. In this example, a user can change the access data for a profile (e.g., HOTEL 108-1) when the user checks in or receives the access data from the hotel. In another example, the access data for a particular RFID reader can be changed on a periodic basis (e.g., every week, every month, etc.). In this example, the user would be able to change the access data for the profile of the location at the periodic times.

Upon selection of one of the number of locations 108-1, 108-2, . . . , 108-N, the universal access device can transmit the access data that corresponds to the profile of the selected location utilizing the RFID protocol for the selected location.

The universal access device 100 can utilize the RFID protocol by following the indicated sequence of the RFID protocol. The universal access device can also utilize the same and/or similar frequency of the RFID protocol by changing a current of the sending antenna 110. The universal access device can also utilize multiple antennas 110 to send access data utilizing various frequencies. Furthermore, the universal access device can reformat the access data to correspond to a particular RFID protocol.

The universal access device 100 can provide access to several restricted areas within the same complex, thereby eliminating the need for multiple access cards and identification cards.

Figure 2:
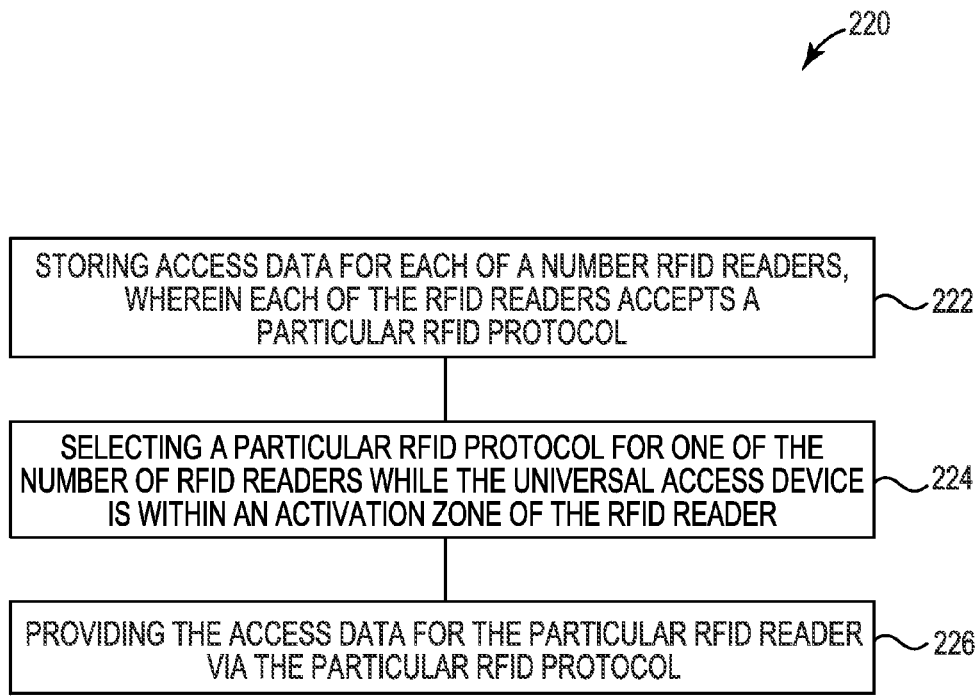
FIG. 2 illustrates a flow diagram of a method for providing a universal access device in accordance with one or more embodiments of the present disclosure.

FIG. 2 illustrates a flow diagram of a method for providing a universal access device (e.g., universal access device 100, etc.) in accordance with one or more embodiments of the present disclosure.

At 222, the universal access device can store access data on a computer readable medium for each of a number of RFID readers, wherein each of the RFID readers accepts a particular RFID protocol. Each of the RFID readers, as described herein, can utilize a different RFID protocol. A particular RFID reader that utilizes a particular RFID protocol may not be able to communicate with other devices (e.g., access devices, tags, etc.) that utilize a different protocol. The universal access device can store the access data for each of the corresponding number of RFID readers in a profile as described herein.

The profile can also include other information about the number of RFID readers. For example, the profile for a particular RFID reader can include a profile name, a description of the RFID protocol, access data for the particular RFID reader, format of the access data, a description of the location of the RFID reader, geographic coordinates, geographic location, etc.

At 224, a particular RFID protocol for one of the number of RFID readers is determined while the universal access device is within an activation zone of the RFID reader. The activation zone of the RFID reader can include an area that can transfer information and/or electrical power to a tag (e.g., access card, smart card, etc.). The activation zone of the RFID reader can be utilized by the universal access device to determine the particular RFID protocol. The activation zone for some RFID readers can be a relatively close proximity (e.g., 1-3 inches, etc.).

The activation zone of the particular RFID reader may enable the universal access device to determine part of the particular RFID protocol. For example, the particular RFID protocol could start by enabling a smart card to send a first signal to the RFID reader. In this example, the universal access device can determine that a first signal can be sent to the RFID reader and based on the interaction with the RFID reader, the universal access device can determine the RFID protocol of the RFID reader for that location (e.g., geographic location, location within a compound, etc.).

The activation zone of the particular RFID reader can be utilized by the universal access device to attempt communication using a variety of RFID protocols. By using a variety of RFID protocols and monitoring a response to the interaction, the universal access device can determine a particular RFID protocol.

At 226 the access data for the particular RFID reader is provided to the particular RFID reader via the particular RFID protocol. The access data that corresponds to the particular RFID reader can be sent to the RFID reader using the determined RFID protocol as described herein. The RFID protocol can be simulated utilizing a number of different techniques. For example, the current sent through an antenna can change the frequency of the communication and replicate a frequency of the determined protocol. In other embodiments, multiple antennas can be utilized to send access data with different frequencies based on the determined RFID protocol In further embodiments, the information stored in the profile for each of the number of RFID readers can enable the universal access device to determine a RFID protocol and corresponding access data. For example, the universal access device can determine information about the geographic location of the RFID reader and the RFID protocol of the RFID reader. The universal access device can utilize the geographic location and the RFID protocol to determine corresponding access data for the RFID reader. The universal access device can transfer the corresponding access data to the RFID reader utilizing the protocol of the RFID reader.

Figure 3:
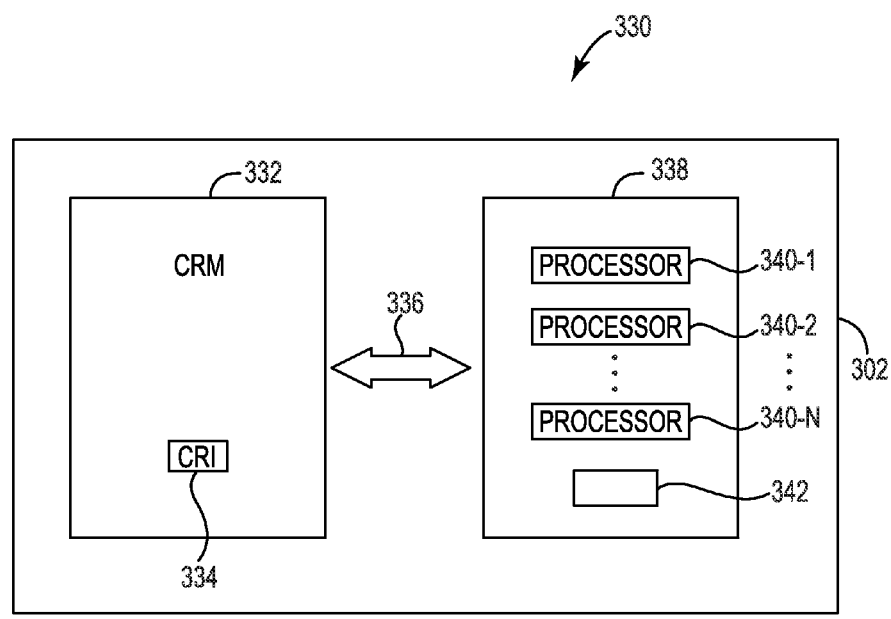
FIG. 3 illustrates a block diagram of an example of a computer-readable medium in communication with processing resources for providing a universal access device in accordance with one or more embodiments of the present disclosure.

FIG. 3 illustrates a block diagram 330 of an example of a computer-readable medium (CRM) 332 in communication with processing resources 340-1, 340-2, . . . , 340-N for providing a universal access device in accordance with one or more embodiments of the present disclosure.

The computing device, as described herein, can also include a CRM 332 in communication with processing resources 340-1, 340-2, . . . , 340-N. CRM 332 can be in communication with a device 338 (e.g., a portable computing device, a smart card using logic with a selection tool, among others) having processor resources 340-1, 340-2, . . . , 340-N. The device 338 can be in communication with a tangible non-transitory CRM 332 storing a set of computer-readable instructions (CRI) 334 executable by one or more of the processor resources 340-1, 340-2, . . . , 340-N, as described herein. The CRI 334 can also be stored in remote memory managed by a server and represent an installation package that can be downloaded, installed, and executed. The device 338 can include memory resources 793, and the processor resources 340-1, 340-2, . . . , 340-N can be coupled to the memory resources 342.

Processor resources 340-1, 340-2, . . . , 340-N can execute CRI 334 that can be stored on an internal or external non-transitory CRM 332. The processor resources 340-1, 340-2, . . . , 340-N can execute CRI 334 to perform various functions. For example, the processor resources 340-1, 340-2, . . . , 340-N can execute CRI 334 to determine a protocol of a RFID reader. A non-transitory CRM (e.g., CRM 332), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of computer-readable media.

The non-transitory CRM 332 can also include distributed storage media. For example, the CRM 332 can be distributed among various locations.

The non-transitory CRM 332 can be integral, or communicatively coupled, to a computing device, in a wired and/or a wireless manner. For example, the non-transitory CRM 332 can be an internal memory, a portable memory, a portable disk, or a memory associated with another computing resource (e.g., enabling CRIs to be transferred and/or executed across a network such as the Internet).

The CRM 332 can be in communication with the processor resources 340-1, 340-2, . . . , 340-N via a communication path 336. The communication path 336 can be local or remote to a machine (e.g., a computer) associated with the processor resources 340-1, 340-2, . . . , 340-N. Examples of a local communication path 336 can include an electronic bus internal to a machine (e.g., a computer, a portable computing device, etc.) where the CRM 332 is one of volatile, non-volatile, fixed, and/or removable storage medium in communication with the processor resources 340-1, 340-2, . . . , 340-N via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 336 can be such that the CRM 332 is remote from the processor resources e.g., 340-1, 340-2, . . . , 340-N, such as in a network relationship between the CRM 332 and the processor resources (e.g., 340-1, 340-2, . . . , 340-N). That is, the communication path 336 can be a network relationship. Examples of such a network relationship can include a local area network (LAN), wide area network (WAN), personal area network (PAN), and the Internet, among others. In such examples, the CRM 332 can be associated with a first computing device and the processor resources 340-1, 340-2, . . . , 340-N can be associated with a second computing device (e.g., a Java® server, etc.). For example, a processing resource 340-1, 340-2, . . . , 340-N can be in communication with a CRM 332, wherein the CRM 332 includes a set of instructions and wherein the processing resource 340-1, 340-2, . . . , 340-N is designed to carry out the set of instructions for providing access data for a particular RFID reader via a particular RFID protocol.

The processor resources 340-1, 340-2, . . . , 340-N coupled to the memory 334 can store a number of user identified RFID reader locations, wherein each location has corresponding access data. The processor resources 340-1, 340-2, . . . , 340-N coupled to the memory 334 can determine a RFID protocol for a particular RFID reader location. The processor resources 340-1, 340-2, . . . , 340-N coupled to the memory 334 can also display a list of user identified RFID reader locations that match the RFID protocol for the particular location. The processor resources 340-1, 340-2, . . . , 340-N coupled to the memory 334 can also enable a user to select one of the identified locations. Furthermore, the processor resources 340-1, 340-2, . . . , 340-N coupled to the memory 334 can transfer the corresponding access data for the selected location using the determined RFID protocol for the particular RFID reader location.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for providing a universal access device, comprising:
utilizing a processor to execute instructions located on a non-transitory medium for:
storing access data for each of a number of RFID readers at a number of RFID reader locations, wherein each of the RFID readers accepts a particular RFID protocol;
selecting a particular RFID protocol for one of the number of RFID readers while the universal access device is within an activation zone of at least one of the number of RFID readers;
providing a list of RFID reader locations that match the particular RFID protocol; and
selecting a particular RFID reader location from the list of RFID reader locations; and
providing the access data for a particular RFID reader at the particular RFID reader location via the particular RFID protocol.

2. The method of claim 1, further comprising: enabling a user to select access data based on the particular RFID protocol.

3. The method of claim 2, wherein enabling the user to select access data includes displaying a list of user defined RFID reader locations and enabling the user to select a particular RFID reader location from the list of user defined RFID reader locations.

4. The method of claim 1, wherein selecting the particular RFID protocol includes sending a number of test data to one of the number of RFID readers to determine the particular RFID protocol based on a RFID response to the number of test data.

5. The method of claim 1, wherein storing access data includes storing a number of profiles for each of the number of RFID reader locations.

6. The method of claim 5, wherein selecting a particular RFID protocol includes utilizing a global positioning system (GPS) location of the universal access device.

7. The method of claim 6, wherein the GPS location is compared with the profiles of each of the RFID reader locations.

8. A non-transitory computer-readable medium storing a set of instructions executable by a processor to cause a computer to:
   select an RFID reader protocol type;
   determine a number of RFID reader locations based on the determined RFID reader protocol type;
   determine acceptable access data based on the RFID protocol type and the number of RFID locations; and
   transmit the acceptable access data to an RFID reader with the RFID reader protocol type.

9. The non-transitory computer-readable medium of claim 8, further comprising instructions to display a list of the number of RFID locations via a user interface.

10. The non-transitory computer-readable medium of claim 9, wherein the acceptable access data is further determined based on a selection of a RFID location from the list of the number of RFID locations.

11. The non-transitory computer-readable medium of claim 8, wherein the number of RFID reader locations are further based on received profile data of each of a number of RFID readers.

12. The non-transitory computer-readable medium of claim 11, wherein each profile data of each of the number of RFID readers includes a customizable description of location, acceptable access data for the respective RFID reader, and RFID reader protocol type.

13. The non-transitory computer-readable medium of claim 8, wherein the RFID protocol type is selected based on a communication with the RFID reader.

14. A system for providing a universal access device, the system comprising a processing resource in communication with a non-transitory computer readable medium, wherein the non-transitory computer readable medium includes a set of instructions and wherein the processing resource is designed to carry out the set of instructions to:
   store a number of user identified RFID reader locations, wherein each location has corresponding access data;
   determine a RFID protocol for a particular RFID reader location;
   display a list of user identified RFID reader locations that match the RFID protocol for the particular RFID reader location;
   enable a user to select one of the identified RFID reader locations; and
   transfer the corresponding access data for the selected RFID reader location using the determined RFID protocol for the particular RFID reader location.

15. The system of claim 14, wherein the list of user identified RFID reader locations includes a customizable description of at least one of the RFID reader locations.

16. The system of claim 14, wherein the user identified RFID reader locations each have a distinct RFID protocol.

17. The system of claim 14, wherein the transfer of access data to an RFID reader enables security access for the selected RFID reader location to the user.

18. The system of claim 14, wherein the universal access device is a mobile device capable of recognizing a number of RFID protocols.

19. The system of claim 18, wherein the universal access device includes an antenna capable of utilizing a number of RFID protocols.

20. The system of claim 14, wherein the list of identified RFID reader locations includes a rating that is based on a determined GPS location and the determined RFID protocol.

* * * * *